Dec. 19, 1967  J. W. ERICKSON  3,358,617
LOAD DIVIDER SUPPORT MECHANISM WITH RETAINER
Original Filed Nov. 23, 1964  3 Sheets-Sheet 1
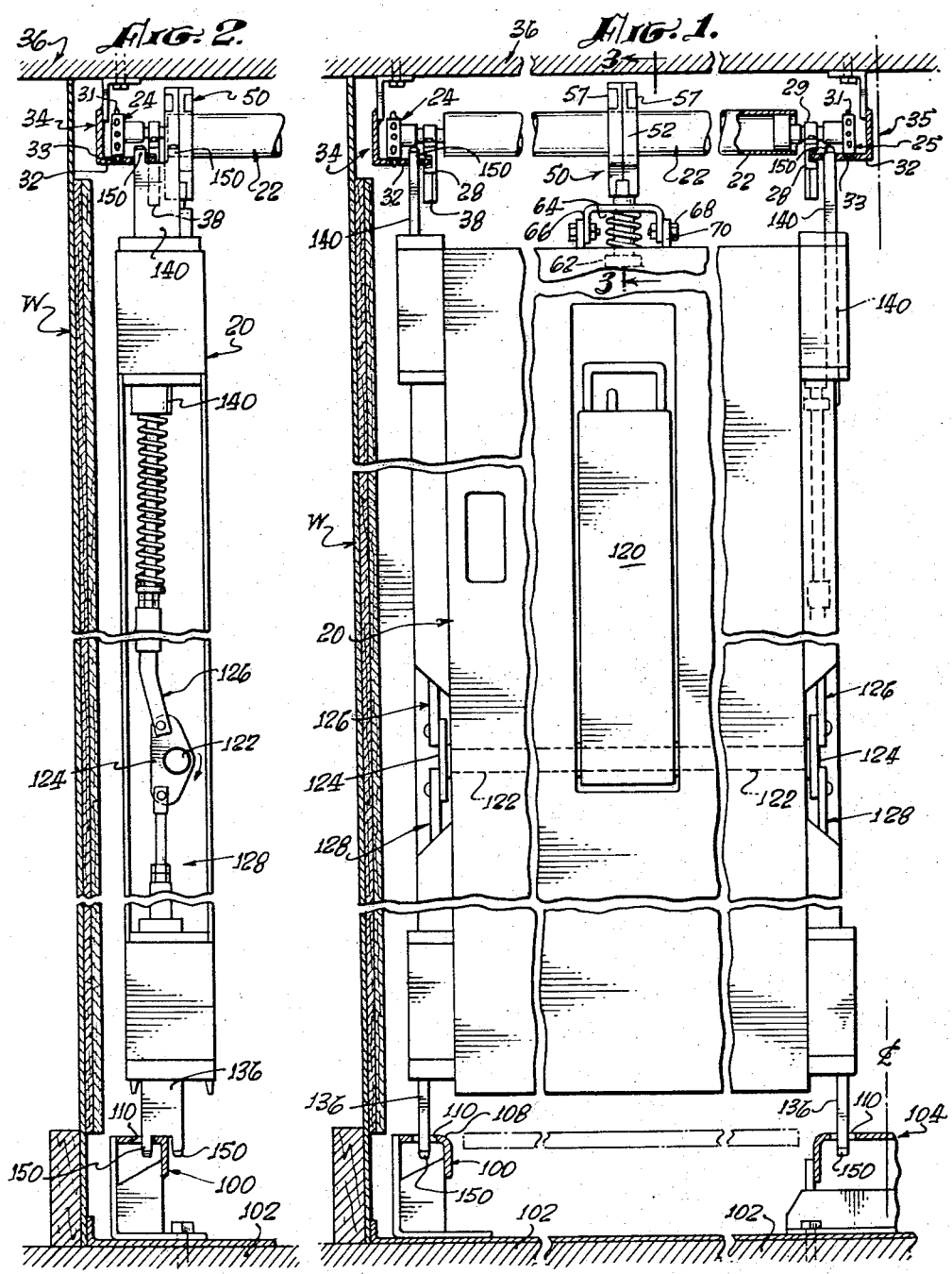
INVENTOR.
JOHN W. ERICKSON,
By Charlton M. Lewis

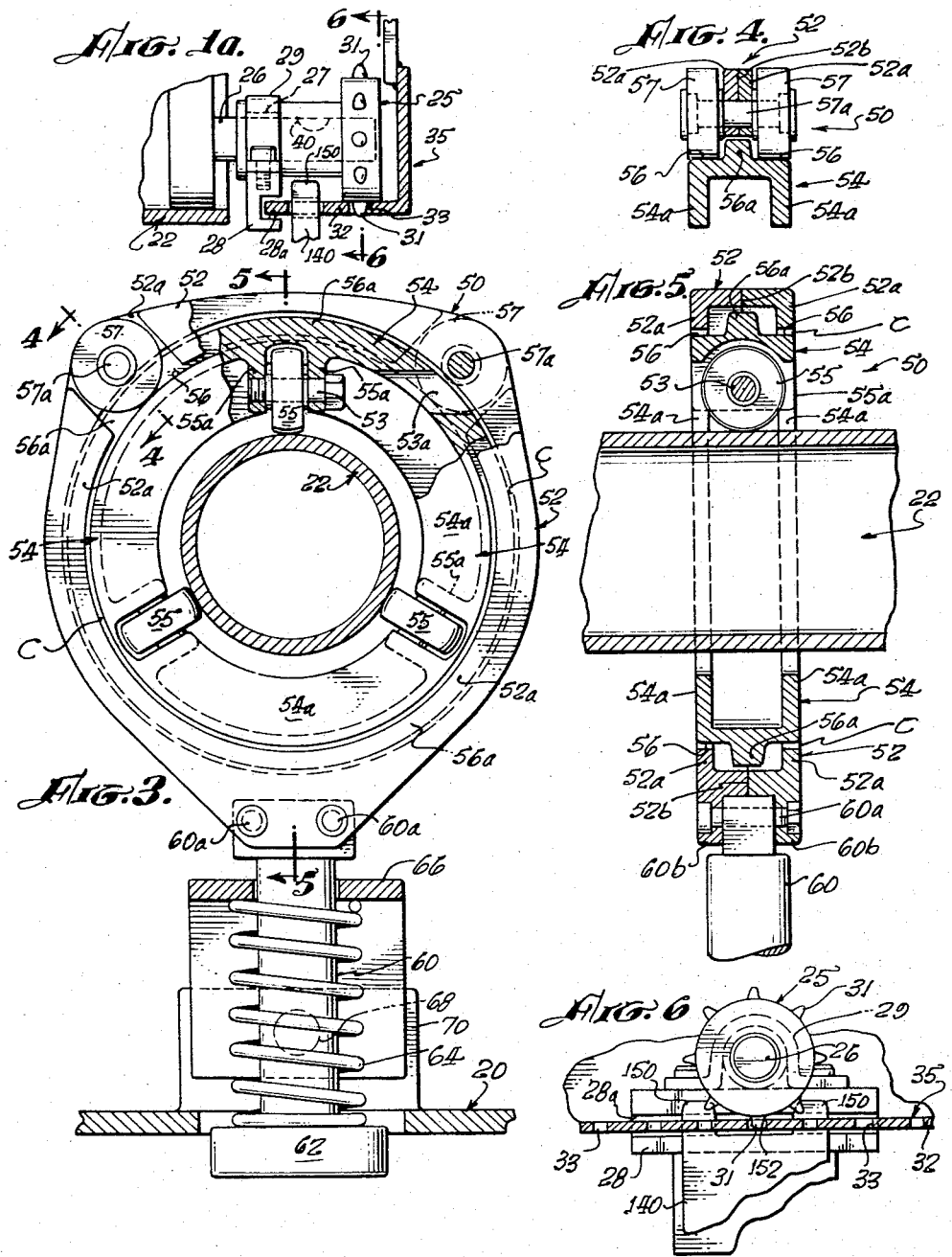

Dec. 19, 1967 J. W. ERICKSON 3,358,617
LOAD DIVIDER SUPPORT MECHANISM WITH RETAINER
Original Filed Nov. 23, 1964 3 Sheets-Sheet 3

INVENTOR
JOHN W. ERICKSON,
By Charlton M. Lewis

United States Patent Office 3,358,617
Patented Dec. 19, 1967

3,358,617
LOAD DIVIDER SUPPORT MECHANISM WITH RETAINER
John W. Erickson, Huntington Beach, Calif., assignor to Preco Incorporated, Los Angeles, Calif., a corporation of California
Original application Nov. 23, 1964, Ser. No. 412,911, now Patent No. 3,319,584, dated May 16, 1967. Divided and this application Oct. 25, 1966, Ser. No. 589,382
5 Claims. (Cl. 105—376)

ABSTRACT OF THE DISCLOSURE

A load dividing gate in a freight car is conventionally suspended from a carriage running on rails mounted essentially on the car sidewalls, with a squaring shaft carrying rotatively fixed sprockets whose teeth engage perforations in the respective rails to maintain the carriage square with the rails. One sprocket may be splined to the shaft to accommodate variations in the rail spacing. It is also conventional to mount fixedly on the gate retaining members that loosely hook around the rail and prevent disengagement of the sprocket teeth from the rail.

The present disclosure increases reliability of the retaining member for such a splined sprocket by journaling the retaining member directly on the sprocket itself, so that it moves axially with the sprocket, and hence maintains a fixed transverse relationship to the rail.

---

This application is a division of my copending patent application, Ser. No. 412,911, filed Nov. 23, 1964, now Patent No. 3,319,584 under the title "Load Divider Support Mechanism." The present application relates more particularly to improve retainer structure for load divider support mechanisms.

This invention has to do with load dividing gates or movable bulkheads for cargo vehicles, such as vans or railroad freight cars, for example, and is more particularly concerned with divider gates that are suspended from two spaced overhead rails to facilitate movement about the vehicle between working and idle positions.

More particularly, the invention provides a unique suspension whereby a load divider gate may be moved about readily and freely within the cargo compartment of a vehicle.

The general structure provides a rotative cross shaft that extends transversely between the two supporting rails and effectively rolls directly on the rails or on rail flanges, the transverse shaft position being maintained by sprocket teeth at its ends that engage suitable mating rack-like formations in the rail flanges. A trolley structure directly engages the shaft and is movable longitudinally of it, and rotatively about it, carrying the gate preferably with a swivel pivot that affords free swinging movement of the gate about a vertical axis. The present invention has to do more particularly with the trolley organization for suspending the gate from such a shaft.

The various characteristics of the invention will be best understood from the following detailed description of a presently preferred and illustrative embodiment, with reference to the accompanying drawings, in which:

FIG. 1 is a fragmentary elevational view of an illustrative embodiment of the invention, showing a half-width gate in locked transverse working position;

FIG. 1a is an enlargement of a part of FIG. 1;

FIG. 2 is a view showing the gate locked in idle position against a car side-wall;

FIG. 3 is an enlarged section on line 3—3 of FIG. 1;

FIGS. 4 and 5 are detail sections on lines 4—4 and 5—5, respectively, of FIG. 3;

FIG. 6 is a detail section on line 6—6 of FIG. 1a; and

Figure 7:
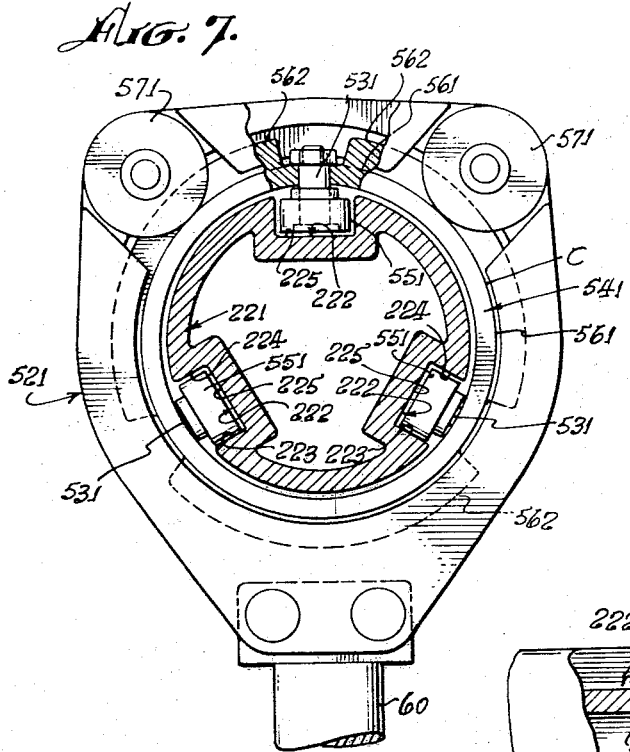
Figure 8:
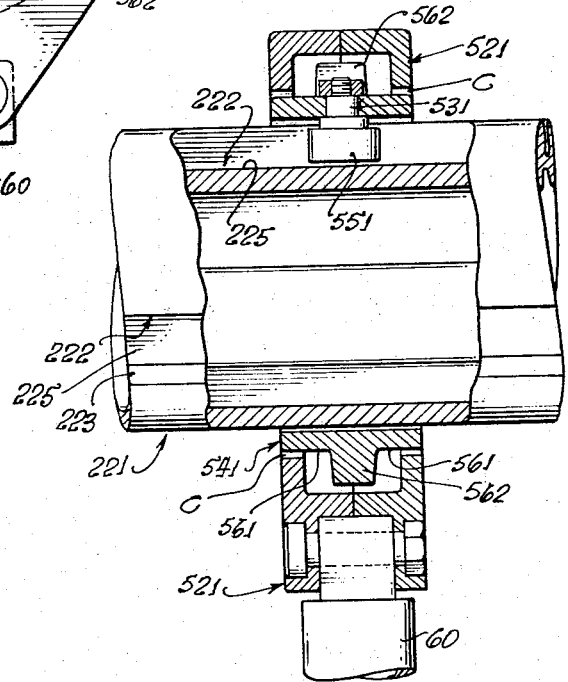

FIGS. 7, 8, similar to FIGS. 3, 5, show a modification.

Referring first to FIGS. 1 and 2, a half width gate generally designated 20, may have a body constructed in any suitable manner giving sufficient rigidity and strength. For instance, it may primarily be constructed of corrugated sheet with such a gate thickness dimension as indicated in FIG. 2.

The gate 20 is suspended from a pair of overhead longitudinal rails 34 and 35 that are secured to and depend from the ceiling structure 36 of e.g. a car. A rotative shaft 22 extends transversely of the car between rails 34 and 35, the shaft ends carrying wheel formations 24 and 25 which roll on horizontal flanges 32 of the respective rails. In preferred form of the structure, wheels 24 and 25 are rotatively fixed on shaft 22 and carry sprocket teeth 31 which engage longitudinally spaced perforations 33 of rack form in the respective rail flanges 32 (see FIGS. 1a and 6). That sprocket action maintains shaft 22 at ring angles to the length of the car, in the manner described, for example, by J. R. Moriarty in Patent 1,388,819.

One of the wheels, shown as left wheel 24 in FIG. 1, may be fixedly mounted on shaft 22 by means of a stub shaft; while the other wheel 25 is preferably splined to its stub shaft 26, as indicated at 40 in FIG. 1a. Free axial movement of wheel 25 then accommodates any variation in transverse spacing of the two rails 34 and 35 in the car. Each of the sprocket wheels is positively retained in sprocketed engagement with its rail by a retaining member 28, which is rotatably mounted on the wheel hub, as by the strap 29 which fits freely in a peripheral channel 27 in the elongated hub. A channel 28a on member 28 freely receives the edge of rail flange 32, and is made long enough (FIG. 6) to prevent binding as shaft 22 rolls along the rails. In this half width gate form the rails 34 and 35 shown in FIG. 1 are duplicated at the other side of the center line of the car (indicated at CL) by other similar rails for carrying the suspension shaft for another half-width gate. Alternatively, gate 20 and shaft 22 may extend the full width of the cargo compartment, rails 35 then typically having the same relation to the opposite sidewall as rail 34 has to sidewall W.

The gate may be provided with locking means of any suitable type for releasably locking it either in transverse working position as in FIG. 1, or in idle position against a side wall as in FIG. 2. As illustratively shown, a longitudinal floor rail 100 is secured to the car floor structure 102 below the ceiling side rail 34; and a double longitudinal floor rail 104 is secured to the floor structure below the pair of central ceiling rails 35. Each upper rail is provided with a series of longitudinally spaced locking perforations 106, and the lower rails 100 and 104 have a similar series of spaced perforations 110, central double floor rail 104 carrying to such perforation series to correspond to the upper double rails.

Gate 20 carries a pair of vertically guided sliding lower locking pins 136 and a pair of vertically guided sliding upper locking pins 140, the pins of each pair being adjacent the respective opposite side edges of the gate in position to engage the rails. Each locking pin 136 and 140 has at its rail engaging end preferably two prongs 150 spaced to enter two adjacent rail perforations in the gate position of FIG. 1. In the suspension here shown, typifying suspensions to which the present invention is applicable, the gate is hung from the suspension member 50 on a vertical swivel axis, to swing about such axis.

Locking pins 136 and 140 swing with the gate. In the idle gate position of FIG. 2, one prong enters a rail perforation 110, with the other prong inside the inner edge of the rail flange. The manually operable handle 120 is pivoted on a horizontal shaft 122 and is connected to all four locking pins via linkage mechanism 124, 126, 128 which may be of conventional type and is not here explicitly described. Handle operation upward into the plane of the gate projects the upper pins upwardly and projects the lower pins downwardly into locking engagement with respective rail perforations, as shown, to lock the gate securely in the selected working or idle position. Operation of handle 120 away from the plane of the gate withdraws all pins simultaneously out of rail engagement, leaving the gate suspended on trolley 50 and free to be moved about the car from one position to another.

The present invention has, among other things, to do with the gate suspension on such a transverse rotative squaring shaft as shown at 22. That shaft is here shown as cylindrically tubular, but as will be understood from the following it is only necessary that the shaft be substantially of externally constant cross-sectional size and shape between the two opposed supporting rails. The suspension member 50 as here shown and which rides as a trolley directly on cross shaft 22 and carries the gate 20 is illustrative and typical of the present invention.

Trolley 50 as here shown comprises the outer load carrying ring 52 and the inner ring 54 arranged coaxially with each other and with inner ring 54 surrounding shaft 22. Three rollers 55 are journalled on such pins as shown at 53 on the inner ring at spaced angular intervals on respective tangential axes in the plane of that ring. The planes of rotation of these rollers are longitudinal of the shaft 22. These rollers, engaging the shaft surface, enable inner ring 54 to move freely longitudinally of the shaft, which, as here described, is typically transverse of the vehicle. Openings such as shown at 53a in FIG. 3 give access to the heads of pins 53 for insertion and removal of the pins and of rollers 55.

Two pairs of rollers 57 are journalled on pins 57a at each side of a central localized web 52a on the outer ring 52. The rotative axes of these rollers 57 are parallel to the axes of the rings and of shaft 22, so, riding the circular track surfaces 56 on inner ring 54 these rollers 57 provide for free relative rotation of the two rings and for rotation of inner ring 54 within outer ring 52. And due to the location of rollers 57 in the upper parts of ring 52 they support that outer ring on inner ring 54. As here shown the rotative axes of the roller pairs 57 are located on planes radial to the axis of inner ring 54 at about 22½° each side of the vertical axial plane in FIG. 3. So rollers 57 also keep outer ring 52 axially centralized on inner ring 54. And, riding track surfaces 56 at opposite sides of a central externally projecting circular rib 56a on the inner ring they also locate outer ring 52 axially on inner ring 54.

The outer, load carrying ring 52 is here shown illustratively as carrying the gate 20 on a vertical swivel suspension axis. In that gate carrying system, a pin or bolt 60 with a head 62 at its lower end depends from the lower part of outer ring 52. A compression spring 64 seats on 62 and presses upwardly as a spring support on a U-shaped suspension member 66 that is pivotally bolted at 68 to brackets 70 secured centrally to the upper edge of gate 20. The pivoting at 68, as well as the rotatability of outer ring 52 on inner ring 54, allows gate swinging about an axis parallel to that of shaft 22, while the pivoting at 68 allows gate swinging in a plane transverse of its own plane whether that plane is or is not parallel to the axis of 22.

Inner ring 54, except at the openings between mounting lugs 55a for rollers 55, has inwardly projecting circular side ribs 54a as well as the outwardly projecting circular central rib 56a. Outer ring 52, except at the openings at each side of central webs 52a for the mountings of rollers 57, has inwardly projecting circular flanges 52a which lie at opposite sides of the central rib 56a on inner ring 54. This arrangement prevents any extensive relative axial movement of the lower part of the outer ring relative to the inner ring. To facilitate assembly and disassembly of the outer ring on the inner one, the outer ring may be fabricated in two identical parts separated on a central plane such as indicated at 52b in FIGS. 4 and 5. Rollers 57, if mounted fixedly on their pins 57a or if axially held together on those pins, will then hold the two parts of 52 together on the plane 52b at those upper roller locations. And the securing pins or bolts 60a passing through the lugs 60b will hold the parts of 52 together at their lower ends.

During gate movement longitudinally of the car the shaft and sprocket assembly rolls directly on rail flanges 32 and is maintained perpendicular to the length of the rails by action of the sprocket teeth 31. During that movement inner ring 54 of suspension 50 rotates with shaft 22, while rollers 57 roll freely on their circular tracks 56. When the gate is moved transversely of the car and hence parallel to shaft 22, rollers 57 remain stationary, while inner ring 54 slides along the shaft on rollers 55. The described gate suspension thus accommodates arbitrary movement both longitudinally and transversely of the car with a transverse rotative shaft structure that may be essentially unitary. And the relative axial thinness of the whole trolley 50 (FIG. 5) provides for that trolley directly riding the rotative shaft 22 into positions close to the shaft supporting rails, as shown e.g. in FIG. 2.

Seeing that inner ring 54 rotates with shaft 22 and moves only longitudinally of that shaft, that shaft need not be cylindric but can be of any cross-sectional shape that provides longitudinal tracks for distributed rollers such as 55 or their equivalents. While rollers 55 roll easily longitudinally of shaft 22 their frictional contact with the shaft prevents or restricts relative rotation about the shaft axis. The longitudinal external surface strips on which rollers 55 ride may be regarded as tracks on shaft 22. It is only necessary, as regards such distributed tracks, that the shaft 22 be substantially of the same size and cross-sectional configuration from its ends between the supporting rails 24 and 25. Whatever the cross-sectional shape of the shaft may be, the internal configuration of the inner ring 54 can accommodate it. For instance, the cross-section of the shaft may be, say, externally hexagonal and hollow or not, and the inner ring 54 may be correspondingly interiorly hexagonal, with or without such elements as the rollers 55 riding some of the longitudinal hexagonal flats.

It is noted that there are only two sets of rollers 57 on axes on outer ring 52 spaced at opposite sides of the vertical central plane through the axis of inner ring 54 (FIG. 3); and that the load—in this case the gate 20—is carried by swivel bolt 60 in that plane, here shown as suspended from the lower part of outer ring 52. With clearance at C between the two rings to prevent frictional rubbing, the upper support of the outer ring on the inner ring by only two spaced bearing rollers and the weight carriage on the central plane, keeps the outer ring normally in its vertical position without any frictional rubbing of the outer on the inner ring.

FIGS. 7 and 8 show a typical and illustrative example of what has been said above about the cross-sectional shape of the shaft, and also show a design in which the over-all diametric size and the projection of the trolley above the shaft are substantially reduced.

These figures show a shaft 221 generally cylindric but with depressed longitudinal trackways 222. Inner ring 541 carries a plurality of, preferably three, rollers 551 mounted to rotate on pins 531 which project on radial axes inwardly of the inner ring 541. The rollers 551 are thus located inwardly of the inner periphery of ring 541 and ride in the depressed trackways 222. The weight imposed on the inner ring, instead of being carried by the then uppermost roller or rollers 55 as in FIG. 3, is carried by those rollers 551 which at any time are below the shaft axis. In such lower positions, as e.g. the two lower rollers in FIG. 7, the rollers engage and ride on the trackway surfaces 223. There is clearance between the rollers and trackway surfaces 223 and 224, also clearance between the shaft and the inner periphery of inner ring 541 and between the rollers and the bottom surfaces 225 of the trackways. Such clearances provide that the rollers may ride the side surfaces such as 223 of the trackways without dragging on the opposite side surfaces, as 224.

Inner ring 541 presents two circular trackways 561 at opposite sides of the projecting circular rib 562 in a design similar to 56 and 56a of FIGS. 3, 5. Central external ribs 562 may be locally broken as shown in FIG. 7 to facilitate the mountings of roller pins 531. As seen by comparison of FIGS. 7, 8 with FIGS. 3, 5, the external diameter of inner ring 541 and its rib 562 is much less than the corresponding external diameters of inner ring 54. That reduction in external size is due to the location of rollers 551 inside the internal periphery of ring 541.

Outer ring 521 with its load carrying rollers 571 is essentially the same as outer ring 52 in FIGS. 3 and 5 except for being much smaller in both internal and external diameters. Its rollers 571 are shown as mounted on the outer ring in the same manner as in FIGS. 3 and 4 and ride the circular trackways 561 just as rollers 57 ride trackways 56 in those figures. Between the outer and inner rings 521 and 541 there is the same clearance C as in FIGS. 3 and 5, and as in those figures the swivel bolt 60 is here shown for carrying the load. The same remarks relative to stabilization apply here as have been made relative to FIGS. 3 and 5.

Seeing that the only purpose of the two sets of rollers in either form of the trolley is to reduce friction between the rings and between the inner ring and the revolving shaft, those anti-friction rollers may be substituted by any suitable anti-friction bearing elements such e.g. as pads of anti-friction material. In fact both rings might be entirely composed of a suitable anti-friction material with inwardly projecting parts riding the inner ring and the shaft. The anti-friction rollers are however at present preferred.

Another feature of the present invention resides in the described axial movement of at least one sprocket 25 with accompanying axial movement of the hold-down member 28 to accommodate variations in the transverse spacing of such rails as 34, 35, and also it will be noted (FIG. 1a) that the locking aperture 106 in upper rail flange 32, and the locking aperture 110 in the lower rails 100, 104, are laterally wider than the locking pins in the aspect of FIG. 1. That provision allows for the same framework variations of rail spacings, with the gate carried locking pins 140 always engageable in the locking aperture of the rail flanges.

I claim:
1. In a movable load dividing structure for transport vehicles and the like, the combination of:
   gate structure adapted to form a partition in a compartment,
   longitudinal rail structure including at least one pair of opposite upper parallel longitudinal rails each having a horizontally projecting flange,
   each said flange having a longitudinal series of spaced rack-like formations,
   a transversely extending squaring shaft having at its ends respective sprockets engaging and riding said rack-like formations, said shaft carrying said gate structure,
   said sprockets both being rotatively fixed on said squaring shaft, at least one of said sprockets being axially movable on said shaft, said sprockets riding the rack-like flange formations at one face of the flanges,
   and means for holding said sprockets in engagement with the rack-line formations by engagement with the opposite faces of the flanges,
   at least said means associated with the axially movable sprocket involving a member relatively rotatively connected to the sprocket for axial movement therewith,
   said member overhanging an edge of the flange and being engageable with the flange face opposite to the face ridden by the sprocket.

2. The combination defined in claim 1, and including also:
   longitudinal series of locking formations on said rails,
   and projectible locking pins carried by the gate structure and adapted to engage said locking formations.

3. In a movable load dividing structure for transport vehicles and the like, the combination of:
   gate structure adapted to form a partition in a compartment,
   longitudinal rail structure including at least one pair of opposite upper parallel longitudinal rails each having a horizontally projecting flange,
   each said flange having a longitudinal series of spaced rack-like formations,
   a transversely extending squaring shaft having at its ends respective sprockets engaging and riding said rack-like formations,
   means suspending said gate structure from said shaft and relatively rotatable and axially movable thereon,
   each said flange also having a longitudinal series of spaced locking formations,
   said sprockets being both rotatively fixed on the ends of said squaring shaft, at least one of said sprockets being axially movable on said shaft, said sprockets riding the rack-like flange formations at one face of the flanges,
   and means for holding said sprockets in engagement with the rack-like formations by engagement with the opposite faces of the flanges,
   at least said means associated with the axially movable sprocket involving a member relatively rotatively mounted on the sprocket and axially movable therewith,
   said member overhanging an edge of the flange and being engageable with the flange face opposite to the face ridden by the sprocket.

4. The combination defined in claim 3 and also including
   upwardly projectible locking pins mounted on the gate and adapted to engage the said locking formations,
   said locking formations being transversely large enough to be engaged by said fixedly spaced locking pins on relative axial movements of said sprocket.

5. The combination defined in claim 1, and wherein said member is journaled on said axially movable sprocket in substantially fixed axial relation therewith.

References Cited
UNITED STATES PATENTS

| | | | |
|---|---|---|---|
| 2,752,864 | 7/1956 | McDougal et al. | 105—376 |
| 3,017,842 | 1/1962 | Nampa | 105—376 |
| 3,017,843 | 1/1962 | Loomis et al. | 105—376 |
| 3,108,547 | 10/1963 | Shaver | 105—376 |
| 3,200,773 | 8/1965 | Moorhead | 105—376 |
| 3,241,502 | 3/1966 | Magarian et al. | 105—376 |

ARTHUR L. LA POINT, *Primary Examiner.*

DRAYTON E. HOFFMAN, *Assistant Examiner.*